April 9, 1968          A. J. HARRIS          3,376,662

SPREADING FISHHOOK

Filed Aug. 25, 1965

INVENTOR.
ALBERT J. HARRIS
BY
Isler & Ornstein
ATTORNEYS

United States Patent Office 3,376,662
Patented Apr. 9, 1968

3,376,662
SPREADING FISHHOOK
Albert J. Harris, R.D. 1, Bowerston, Ohio 44695
Filed Aug. 25, 1965, Ser. No. 482,429
4 Claims. (Cl. 43—36)

ABSTRACT OF THE DISCLOSURE

A spreading fishhook having a plurality of spring-biased normally-divergent hook arms which are drawn together and maintained in selected positions by means of a slidable retainer embracing the arms. Detents provided on the arms serve to establish the locking positions of the slidable retainer and the arms are so bent as to provide a fulcruming abutment, at one locking position, to establish a leverage spring tension on the hook arms to augment the initial spring biasing force in the spreading action. When a fish strikes the hook with sufficient force, the hook arms are displaced from retention by the slidable retainer element and the spreading action of the hooks occurs.

---

The present invention relates generally to fishhooks of the type used with a line and having one or more barbed tips or ends. More particularly, the present invention relates to a fishhook having at least two barbs which are relatively movable with respect to each other and are capable of spreading or diverging from each other when a fish strikes the hook.

It is a primary object of my invention to provide a fishhook of the character described which has an improved spreading action.

A further object of my invention is to provide a fishhook of the character described with means for adjustably varying the spreading force exerted by the barbs.

Still another object of my invention is to provide a fishhook of the character described with means for adjustably varying the striking force required to initiate spreading action of the fishhook.

Other objects and advantages of my invention will become apparent during the course of the following description.

In the accompanying drawings forming a part of this specification and in which like numerals are employed to designate like parts throughout the same, FIG. 1 is a view in elevation of a spreading fishhook embodying the features of my invention, and showing the fishhook in its spread position.

Figure 1:
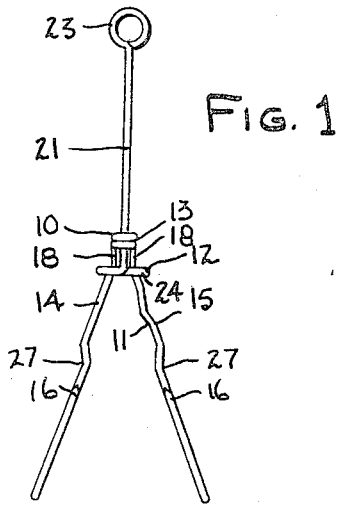
Figure 2:
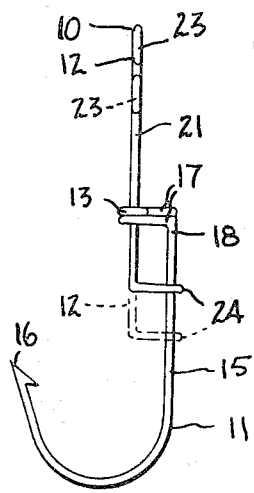
FIG. 2 is a view in side elevation of the fishhook shown in FIG. 1.
Figure 3:
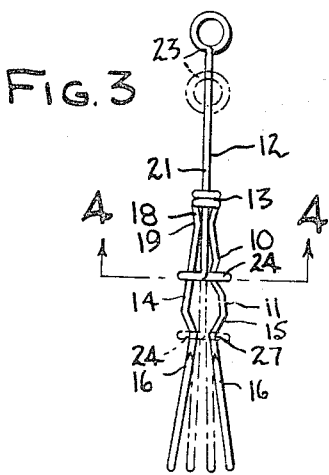
FIG. 3 is a view in elevation similar to that of FIG. 1, but showing the fishhook in its cocked or closed position.

Referring more particularly to the drawings, the fishhook or fishhook assembly, indicated generally by the reference numeral 10, consists of a hook body 11 and a cooperating locking slide 12. The hook body 11 is preferably made of a single length of spring-tempered wire which is coiled at its midsection to provide a coil spring 13, one end of which is extended to provide a hook arm 14 and the other end of which is extended to provide a hook arm 15. The free ends of the arms 14 and 15 are bent or curved upwardly to provide hooking portions upon which are formed or mounted barbs 16.

Figure 5:
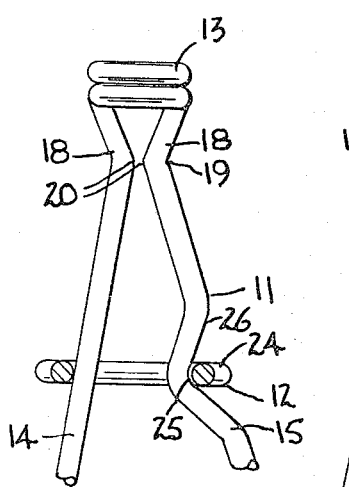
FIG. 5 is a fragmentary enlarged elevation of the upper portion of the fishhook shown in FIG. 3, as it appears when the slide is in its first locking position.
Figure 6:
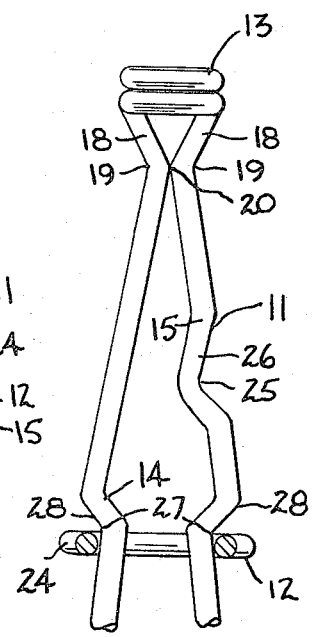
FIG. 6 is a view similar to FIG. 5, but showing the change in the correlation of the elements when the slide is in its second locking position.
Figure 4:
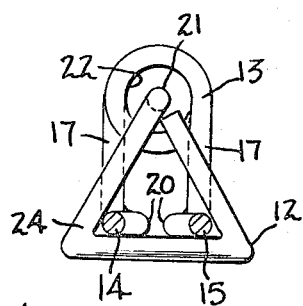
FIG. 4 is a cross-sectional view, taken as indicated on line 4—4 of FIG. 3, and showing details of the slide arrangement.

As best seen in FIGS. 4, 5 and 6, each of the arms 14 and 15 adjacent to the coil spring 13 has a short horizontally extending portion 17 which projects rearwardly of the coil 13, and each arm is then bent at approximately 90° to the portion 17 to provide short vertically depending portions 18 which are spaced from each other and substantially parallel to each other in the spread position, as shown in FIG. 1.

Each of the portions 18 terminates in a bend 19 which lines in a plane common to the two arms 14 and 15 and which causes the arms to diverge from each other in an angular relationship of any desired magnitude such as, for example, 45°. The particular angular relationship which is preferable, will depend upon the length of the arms 14 and 15 and upon the size and configuration of the hook ends and thus will be determined in the design of the fishhook assembly in connection with the general size and species of fish for which the hook is intended.

The combination of the two bends 19 provides a necked portion on the hook arms 14 and 15. As will appear more fully hereinafter, the inwardly-facing extremities 20 of bends 19 can provide abutment points which serve as a fulcrum in establishing the spreading force of the arms 14 and 15.

The slide 12 is provided with a stem or shank 21 which extends freely through the guide opening provided centrally of the coil spring 13. The upper end of the stem 21 terminates in an eye 23 to which a leader or other portion of the fishing line can be attached. The lower portion of the stem 21 terminates in a retainer portion 24 which is of triangular configuration and extends substantially normal to the axis of the stem 21. The triangular retainer portion 24 embraces and is traversed by the hook arms 14 and 15. The sliding movement of the slide 12 relatively to the hook arms 14 and 15 is limited in one direction by the abutment of the eye 23 with one end of the coil 13, and is limited in the opposite direction by the abutment of the retainer portion 24 with the opposite end of the coil 13.

A shallow bend 25 is provided on the arm 15 and serves as a detent for the first retaining or locking position of the slide 12. The portion 26 of the bend 25, which serves to provide the retaining angle, is disposed at an angle of approximately 10° to the upper portion of the arm 15 so as to provide only a moderate resistance to the unlocking movement of the slide 12. A second bend 27 is provided in the arm 15 downwardly from the bend 25 and a companion bend 27, coacting therewith, is also provided in the arm 14. The combination of the bends 27 provide a second detent or locking position for the slide 12, and their portions 28 may provide a retaining angle of approximately 15° so that the pair of bends 27 provide a greater resistance to unlocking movement of the slide, than is provided by the bend 25.

In setting the fishing hook assembly 10, the slide 12 is manually moved to either the first locking position or the second locking position, as desired. As best seen in FIG. 5 of the drawings, when the slide is positioned in the bend 25, corresponding to the first locking position, the arms 14 and 15 are drawn toward each other, causing energization of the coil spring 13 and also causing some deformation of the portion 18 of each arm so that they tend to converge towards each other. If a fish strikes the hook assembly 10 with sufficient force, the arms are caused to move downwardly relatively to the slide 12, thereby releasing the arms 14 and 15 from the locking action of the slide and causing them to spread abruptly and dig in to the mouth of the hooked fish.

As best seen in FIG. 6, if the slide 12 is positioned in the bend 27, corresponding to the second locking position, the arms 14 and 15 are drawn more closely towards each other, causing the portions 18 to abut at the points 20 which, in turn, become fulcrum points which increase the bending stress upon the locked arms 14 and 15. Due to the increased retaining angle of the combination of detents 27, a greater striking force is required to initiate relative movement of the hook relative to the slide when the slide is in the second locking position. Thus, for example, if the spreading action of the hook is triggered by a pulling force of 1¾ pounds when the slide is in the first locking position, a pulling force of 2½ pounds may be required to trigger the spreading action of the hook when the slide is in the second locking position.

Furthermore, in the second locking position, the arms 14 and 15 are under greater tension or stress and will spread with greater force, when released, than in the first locking position. Thus, the second locking position would ordinarily be used for larger fish and the first locking position would be used for the smaller varieties.

As is apparent from the foregoing, my spreading fishhook not only provides means for driving the hook more firmly into the mouth of the fish by spreading action in response to the strike, but also provides means for adjusting the force of the spreading action as well as the triggering force required to initiate the spreading action of the hook.

By utilizing a triangular configuration on the retaining portion 24 of the slide 12, the two corners of the triangle provide tracks for the arms 14 and 15 during relative movement of the slide, so that the slide is guided and maintained in proper relationship to the arms 14 and 15 to prevent relative twisting of the arms or of the slide which could cause malfunction of the hook assembly. The detents 25 or 27 maintain the slide retainer 24 in its selected locking position and prevent inadvertent slipping of the slide during casting.

It is to be understood that the form of my invention, herewith shown and described, is to be taken as a preferred example of the same, and that various changes in the shape, size and arrangement of parts may be resorted to, without departing from the spirit of my invention, or the scope of the subjoined claims.

Having thus described my invention, I claim:

1. A spreading fishhook assembly comprising the combination of a plurality of flexible hook arms, integral spring means interconnecting said hook arms and yieldably maintaining them in spread-apart relationship, each of said hook arms having substantially parallel portions extending downwardly from said spring means when in said spread-apart relationship, the distal end of each of said portions terminating in an outboard bend to cause the remaining portions of said hook arms to be in diverging relationship to each other, a retainer element slidably embracing said hook arms and longitudinally movable downwardly to draw said hook arms together in opposition to said spring means, a plurality of detents provided on said remaining portion of at least one of said hook arms in the path of slidable movement of said retainer element and selectively cooperable with said retainer element to releasably maintain said retainer element in a selected locking position on said arms, one of said locking positions maintaining said hook arms drawn toward each other to an extent which is opposed solely by said spring means, and another of said locking positions maintaining said hook arms drawn closer toward each other to an extent sufficient to bring said outboard bends into fulcruming abutment with each other whereby said remaining portions of said flexible hook arms are resiliently deformed to create a lever spring means separate from and in augmentation of said first-named spring means.

2. A combination as defined in claim 1, wherein the retaining force of one of said detents is greater than the retaining force of another of said detents, whereby the releasing force necessary to slide said retainer element out of its locking position is greater when said element engages said one detent than when it engages another of said detents.

3. A combination as defined in claim 1, wherein said retainer element has a polygonal configuration the corners of which provide tracks engaging said hook arms, whereby said element is guided in its longitudinal movement by said hook arms and maintained against rotation relatively to said arms.

4. A spreading fishhook assembly comprising the combination of a pair of flexible hook arms, spring means interconnecting said hook arms and yieldably maintaining them in diverging spread-apart relationship, a retainer element slidably engaging said hook arms and longitudinally movable to a first releasable locking position to draw said hook arms toward each other in opposition to said spring means, a pair of opposed inwardly facing abutments provided on said hook arms and being closely spaced from said spring means, said retainer element being movable to a second releasable locking position to draw said arms toward each other in opposition to engagement of said abutments with each other, whereby said arms are leveraged against said abutments to a greater stress by said retainer element in said second position than in said first position, and means establishing a predetermined resistance to releasing movement of said retainer element relatively to said hook arms.

References Cited
UNITED STATES PATENTS

| | | | |
|---|---|---|---|
| 377,294 | 1/1888 | Dietz | 43—36 |
| 2,623,320 | 12/1952 | Bowman | 43—43.12 |
| 2,746,199 | 5/1956 | Dyczkowski | 43—36 |

ALDRICH F. MEDBERY, *Primary Examiner.*

SAMUEL KOREN, *Examiner.*

D. J. LEACH, *Assistant Examiner.*